March 8, 1955 C. T. McELROY 2,703,463
MEANS FOR AND METHOD OF EMBOSSING PLYWOOD
Filed May 20, 1952 2 Sheets-Sheet 1
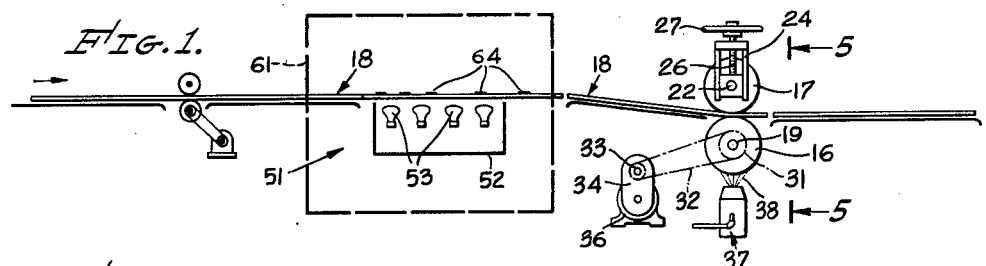
FIG. 1.
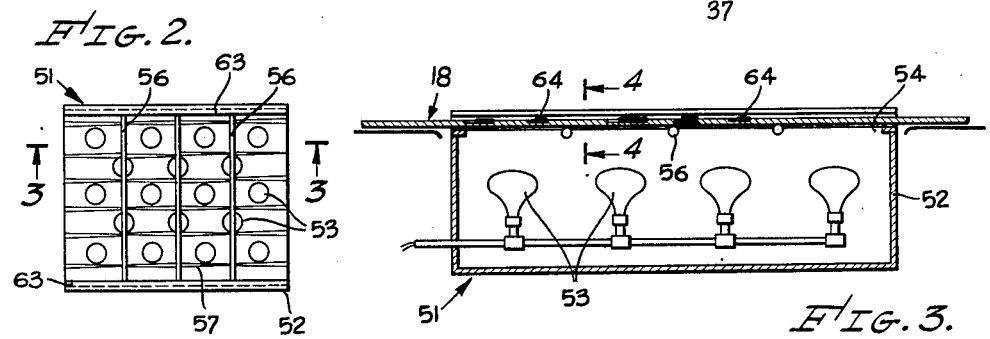
FIG. 2. FIG. 3.
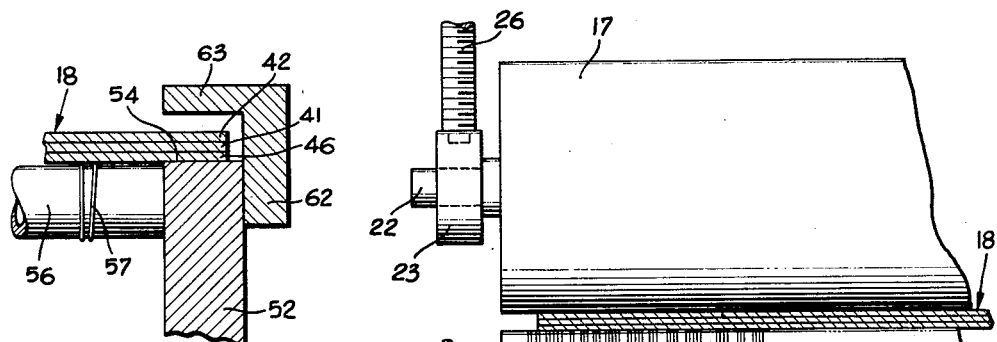
FIG. 4.
FIG. 5.
FIG. 6.
INVENTOR.
CLIFFORD T. McELROY
BY
*Stuart M. Maule*
ATTORNEY.

March 8, 1955 C. T. McELROY 2,703,463
MEANS FOR AND METHOD OF EMBOSSING PLYWOOD
Filed May 20, 1952 2 Sheets-Sheet 2

INVENTOR.
CLIFFORD T. McELROY
BY
ATTORNEY.

United States Patent Office 2,703,463
Patented Mar. 8, 1955

2,703,463

MEANS FOR AND METHOD OF EMBOSSING PLYWOOD

Clifford T. McElroy, Temple City, Calif.

Application May 20, 1952, Serial No. 288,881

8 Claims. (Cl. 41—1)

This invention relates to the art of woodworking, and more particularly to the processing of plywood to produce an interesting and attractive embossed pattern thereupon.

An object of my present invention is to provide a method of and apparatus for embossing plywood panels which represent an improvement over the method and apparatus forming the subject-matter of co-pending application, Serial No. 126,724, filed November 12, 1949, by Rehback Lewis and myself. That application and the invention forming the subject-matter thereof are concerned with the problem of compensating for voids, such as knot holes, in one or more of the plies of a plywood panel other than the ply being embossed, so as substantially to equalize the pressure applied by an embossing roller and a backing roller to a panel being passed therebetween. Without such compensation, whenever any void occurs in an intermediate or a back-face ply, the necessary support for the front-face ply, to which the embossing is being applied, is not provided; and accordingly the unsupported areas of the front-face ply will be embossed either not at all, or not as deeply as the portions where all plies of the panel are present, resulting in a panel so disfigured by unembossed, or "bald" spots as to destroy its commercial value.

Whereas the apparatus necessary for the accomplishment of the method of compensation covered by the said co-pending application is satisfactory in many respects, it is inherently disadvantageous because of the almost excessively high cost of the backing roller, the working surface of which is provided by a thick layer of relatively soft, resiliently yieldable material, such as rubber soft enough to be compressed to considerably less than its normal thickness when pressed against the plywood panel with sufficient force to support the panel while the opposite face thereof is being embossed. Even when rubber is available in plentiful supply, and therefore not included in the list of "critical" materials, the high cost and relatively short life of such a backing rather make it so expensive that its commercial practicability is impaired.

The present invention, therefore, seeks to provide a method of compensating for the presence of voids within intermediate and back-face plies of plywood during the performance of a pressure-embossing operation thereon which is not dependent upon the use of a cushion-surfaced backing roller, but which, in contradistinction thereto, requires only relatively small patches of resiliently yieldable material to only the localized areas of a plywood panel where such voids occur.

Another object is to provide as a constituent and important part of my improved and simplified method of compensating for voids, a method of locating and ascertaining the size and shape of such voids occurring in an intermediate ply of the panel, and thus impossible of observation by normal visual inspection, because of their being completely concealed within the interior of the laminated construction.

A further object of the present invention is to provide a method of compensating for voids in a plywood panel, as hereinabove described, which minimizes the danger of embossing the front-face panel too deeply in those portions immediately following an area where a void occurs in one or more of the other plies, thus providing such control during the performance of the method that a serious difficulty inherent in the method of the said co-pending application is obviated.

A further object of the present invention is to provide a method of embossing plywood panels, so rapidly and economically that it lends itself to quantity production in a "continuous flow" operation, and, as hereinabove indicated, by means of apparatus of a relatively simple and inexpensive nature.

Yet another object of my invention is to provide suitable apparatus whereby the method of the present invention can be carried out rapidly, efficiently, and economically.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings:

Figure 1 is a view illustrating diagrammatically the manner in which the method comprising the present invention is performed.

Figure 2 is a top plan view of the illuminated inspection box comprising a portion of the apparatus used in the performance of the method of the present invention.

Figure 3 is an enlarged, longitudinal, vertical sectional view taken upon the line 3—3 of Fig. 2, with the direction of view as indicated.

Figure 4 is a still more highly enlarged detail view, taken upon the line 4—4 of Fig. 3, with the direction of view as indicated.

Figure 5 is a still more highly enlarged elevational view of the embossing rollers and the heating apparatus co-operatively associated therewith, portions of the figure being broken away to reduce its size. This figure may be considered a transverse vertical sectional view taken upon the line 5—5 of Fig. 1, with the direction of view as indicated, but drawn to a highly enlarged scale.

Figure 6 is a detail view in perspective showing an assortment of sizes of the cushioning pads used in compensating for voids in certain plies of a solid panel as that panel is being fed between the embossing rollers of Fig. 5.

Figure 9:
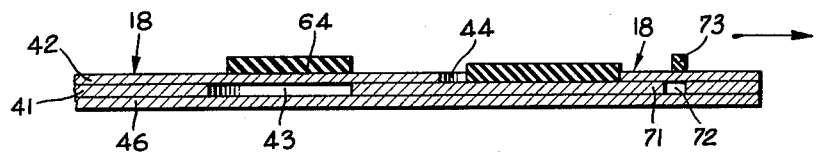

Figure 9 is a highly enlarged detail view in longitudinal vertical section through a part of the panel and showing the manner of application of the void-compensating pads thereto in registry with voids in the back face panel and showing the manner of application of the pads of Fig. 6 thereto to compensate for voids occurring not only within the back-face ply of the panel, but also voids occurring within an intermediate ply, in accordance with the principles of the present invention.

Figure 10:
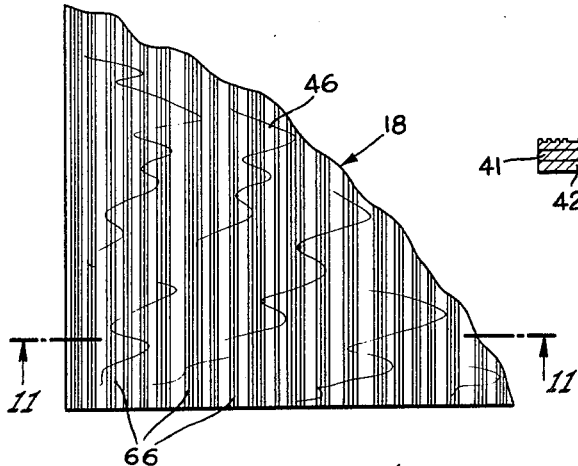

Figure 10 is an enlarged fragmentary view illustrating a portion of a plywood panel to the front face of which embossing has been applied in accordance with the principles of the present invention.

Figure 11:
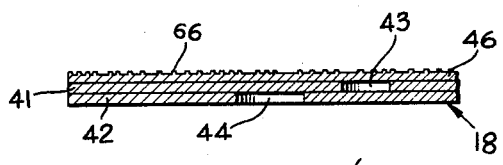

Figure 11 is a transverse, vertical sectional view taken upon the line 11—11 of Fig. 10, with the direction of view as indicated.

Figure 1 illustrates diagrammatically the apparatus whereby the method of the present invention can advantageously be performed. It comprises a pair of co-operative, opposed embossing rollers 16 and 17 revolubly mounted in suitably spaced-apart relation to permit a series of panels 18 to pass therebetween. One of the rollers, say the roller 16, is revolubly supported by having its trunnion shaft 19 journaled in preferably fixed bearings 21, whereas the trunnion shaft 22 of the upper roller 17 is revolubly supported in bearings 23 which are slidable toward and away from the shaft 19 of the lower roller 16, as in a suitable yoke or framework 24. Each of these adjustable bearings 23 has a pressure screw 26 cooperatively associated therewith and a hand wheel 27, or other suitable, convenient means for turning the pressure screws 26 so as to force the upper roller 17 toward the lower roller 16 with sufficient pressure to serve as a suitable backing or pressure roller so that a design such as a plurality of unequally spaced lines 28 in the form of preferably unevenly spaced ridges and grooves of varying depths engraved or otherwise cut in the peripheral surface of the lower roller 16, will be imprinted in an embossing action in the under face of a panel 18 of plywood passed between the rollers 16 and 17. Means are provided for turning the rollers, such as a sprocket gear 31 rigid with the trunnion shaft 19 of say the lower roller 16 and connected as by a driving chain 32 with the driving sprocket gear 33 of a speed reduction mechanism 34, illustrated in Fig. 1 as being operably connected to a driving motor 36. The embossing roller 16 also preferably has associated with it a burner 37 whereby gaseous fuel or the like is burned immediately below the embossing roller 16 in such position that the heated products of combustion, indicated at 38, flow upwards around the embossing roller 16 and thereby raise the temperature so as to increase the efficiency of the embossing action performed by the roller 16.

Thus it may be seen that a pattern, the nature of which is determined by the design of lines, ridges, and grooves, or other suitable pattern engraved upon the surface of the embossed roller 16, is reproduced rapidly, effectively in one outer face of each panel 18 of plywood fed between the rollers 16 and 17. However, it is also to be observed that the efficiency and effectiveness over the entire area of each panel with which this design is reproduced thereon is dependent upon pressure exerted by the upper or backing roller 17, the magnitude of which is determined by the adjustment of the bearing blocks 23, as determined by the manipulation of the pressure screws 26. But the matter of exerting the pressure of the backing roller 17 equally over the entire area of the panel 18 is complicated by the fact that standard commercial grades of plywood are usually characterized by a relatively large number of knotholes occurring in both an intermediate ply 41 and the back-face ply 42, as indicated respectively at 43 and 44 in Figures 7, 8, and 9, although the front-face ply 46 to which the embossment is to be applied is usually free of knotholes and other blemishes. But whenever a knothole 43, 44 or other void occurs in any of the plies 41, 42 other than the front-face ply 46, the backing roller 17 fails to support the front-face ply 46 with such degree of rigidity and firmness than when the embossing roller engages the outer face of the front-face ply 46, that ply will be flexed upwards, tending to partially fill the void 43 or 44, as the case might be, and thus causing failure of the associated portion of the pattern 28 of the embossing roller 16 to be imprinted in the outer face of the ply 46. The method of the present invention provides improved and simplified means for compensating for such voids 43 and 44 and thereby providing adequate support or backing to the front-face ply 46 during the operation of passing the panels 18 between the rollers 16 and 17 so as to assure uninterrupted continuity of the pattern being applied to the outer face of the front-face ply 46.

Disposed adjacent to the embossing rollers 16 and 17 and on the inlet or entrance side thereof, there is provided an inspection table indicated in its entirety at 51 in Figs. 1, 2, and 3, and comprising a preferably open topped box or other suitable substantially light proof enclosure 52 within which a suitable source of illumination is provided, such as a plurality of electric light bulbs 53 disposed at preferably equally spaced arrangement throughout the entire horizontal area of the light box 52. Means are provided for supporting and guiding panels 18 of plywood in passage over the open top 54 of the light box 52, such as a plurality of transversely extending bars or ribs 56 supporting a plurality of relatively tightly stretched cords, wires, or the like, as indicated at 57. These supporting cords or wires 57 are so wound upon the transverse ribs 56 that they extend tangentially therefrom in the plane of the extreme upper portions of the ribs 56 with the result that they provide a substantially smooth guiding and supporting structure over which the panels 18 can slide smoothly and uninterruptedly, without however offering any substantial interference with upward passage of light from the bulbs 53 to and through each panel 18 as it passes over the light box 52.

The number and intensity of the light bulbs 53 will of course be regulated proportionately with the thickness of the panels, i. e., the number of plies of the panels 18 to be treated; but the amount of light should be so regulated that a substantial amount of light will be permitted to pass through a panel wherever a void, such as a knothole 43 or 44, occurs in any of its plies. According to such an arrangement, one or more operators standing alongside the inspection table 51 will be enabled to observe visually a rather prominently displayed light spot on the upper surface of each panel in registry with each of the voids 43 and 44 regardless of whether the void occurs in an intermediate ply 41 or the uppermost, or back-face ply 42. The efficiency of this inspection operation and the ease with which the light spots may be observed, are enhanced by enclosing the inspection table 51 within a suitable substantially light-proof enclosure indicated diagrammatically at 61 in Fig. 1, thus effectively darkening the space surrounding the inspection table 51 and within which the inspector or inspectors operate, that the light spots on the upper surface of a panel 18, each of which indicates the presence of a void, are more vividly apparent.

The ease with which the light spots can be observed is further enhanced by providing means for preventing leakage of light from the light box 52 around the lateral edges of the panels 18 as they pass over the light box 52, such as an upstanding rail 62 on each side of the light box 52, each of which rails 62 supports a flange 63 extending inwardly over the associated edge of a panel 18, but sufficiently spaced thereabove to prevent binding as the panel 18 moves.

A large number of pads or patches 64, such as those shown in detail in Fig. 6, are provided, preferably stored in bins conveniently accessible to the hands of the inspectors, and preferably assorted according to size. These patches 64 are composed of suitable resiliently yieldable material such as vulcanized sheet rubber, the inner tubes of pneumatic tires having been found to provide an excellent source of this material. Sheet rubber is cut into preferably disc form, as illustrated in Fig. 6, although other shapes may be provided if conditions indicate the desirability of so doing. Whenever an inspector observes a light spot upon the upper surface of a panel 18 being passed over the inspection table 51, he selects a pad 64 slightly smaller than the size of the void through which light passes to illuminate the spot which the inspector has observed. According to the present method, the inspector then places the pad so selected directly upon the light spot and consequently in registry with the void causing that light spot. However, instead of placing the pad directly in the center of the light spot, it is preferred that the pad be placed slightly in advance of the center, i. e., offset from the center of such light spot toward that edge of the panel 18 which leads in its passage over the inspection table 51 and to and between the advancing rollers 16 and 17. Owing to the relatively yieldable nature of the material of which the pads 64 are formed, they will be squeezed out to slightly larger area than that which they occupy normally, as the pressure of the backing roller 17 is imposed thereupon; and because of the motion of which the panel and pad 64 partake during that passage between the rollers, the pad 64 will be squeezed slightly in a rearward direction, thus causing the pad, in its described increased size due to the pressure of the backing roller 17, to expand so that its after edge substantially coincides with the after edge of the void for which that pad is intended to provide compensation. Were a pad 64 of the same size as the patch of light which an inspector has observed, to be placed upon that patch of light, the pressure of the backing roller will cause the pad to expand to an area substantially greater than the light spot with the result that the after edge of the pad 64 would be squeezed to a position beyond the after edge of the void. This would cause the backing roller to apply more pressure than desired to the portion of the panel 18 immediately behind the void with the result that the pattern of the embossing roller 16 might be impressed more deeply into the outer face of the front ply 46 over that area of the panel 18 where the described excessive pressure is applied. However, by employing a pad 64 slightly smaller than the spot of light and positing the pad 64 slightly forward of the spot's center, in the manner hereinabove explained, substantially equal backing or support is provided for the front-face ply 46 throughout that ply's entire area, thus assuring that the pattern of the etching 28 upon the embossing roller 16 be applied evenly throughout the entire area of the front face ply 46, as indicated at 66 in Figs. 10 and 11.

Occasionally the sheet 71 of very thin material of which the intermediate ply 41 is composed terminates, and the next successive sheet 71 in the same panel 18 does not quite make contact with it, thus leaving a relatively narrow gap 72 extending throughout a substantial portion of the width of the panel 18—in fact in some instances such a narrow void extends throughout the entire width of a panel. In order to compensate for voids of this nature the inspectors are also preferably provided with long thin strips 73 of the same material as that of which the circular patches or pads 64 are composed. The inspectors lay these long, thin strips 73 upon the bands of light appearing on the upper surface of the uppermost ply 42 as a consequence of the fact that light from the bulbs 53 passes through the spot 72 to illuminate the upper surface of the uppermost ply 42 in the same manner as in the case of the voids 43 and 44. Here, again, however, it is preferred that the strips 73 of cushioning material selected be substantially narrower than the bands of light indicating the presence of the spots 72, and that these relatively narrow strips 73 be positioned in the leading portions of the narrow bands of light so as to avoid the danger that the after edges of the strips 73 will be expanded into overlapping relation with the after edges of the voids 72 for which the strips 73 are intended to provide compensation as they pass between the embossing rollers 16 and 17.

Figure 7:
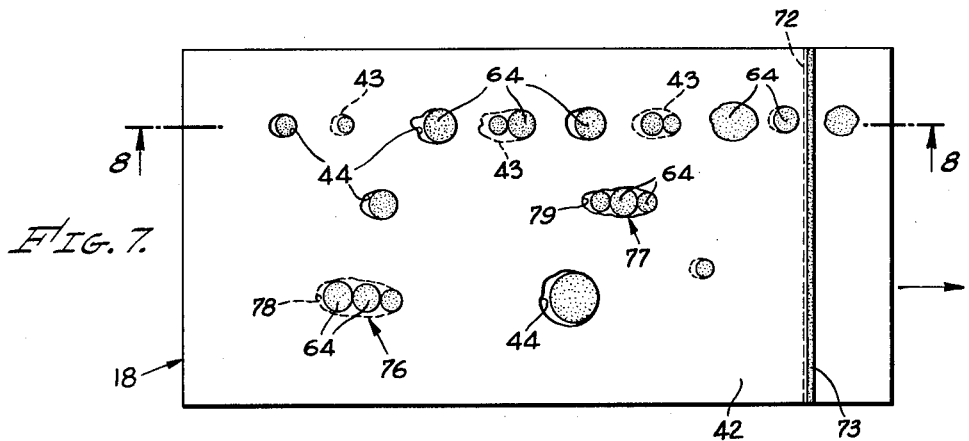
Figure 7 is a top plan view illustrating a plywood panel to which void-compensating pads, such as those illustrated in Fig. 6, are applied to the panel to compensate for voids therein, in accordance with the principles of the present invention.
Figure 8:
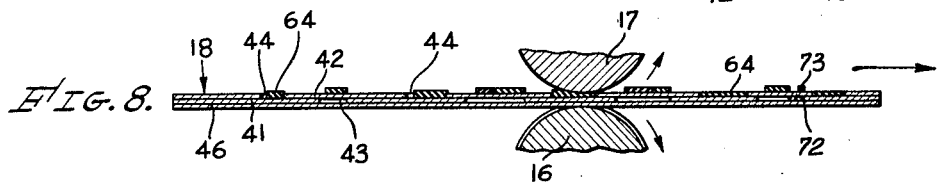
Figure 8 is a longitudinal vertical sectional view which may be considered to have been taken upon the line 8—8 of Fig. 7 with the direction of view as indicated, but showing the plywood panel of Fig. 7 in process of being fed between the embossing rollers.

As indicated at 76 and 77 in Figure 7, upon some occasions a void 78 or 79 may occur in the ply 42 or ply 41, respectively, which is shaped otherwise than round, in which case the inspectors may employ a plurality of relatively small pads 64 distributed over the area of the irregularly shaped patch of light which indicates the presence of such an irregularly shaped void. It is desired, however, that care be exercised to select pads 64 so that their total area is substantially smaller than the light spot indicating the void for which the pads are to provide compensation, thereby avoiding the danger that the pads will be squeezed out to an area larger than that void as they pass between the embossing rollers.

I claim:

1. The method of embossing an outer face of a plywood panel which comprises inspecting said panel to determine the location of voids therein, placing pads in registry with said voids so located, and then subjecting said panel and pads to embossing pressure.

2. The method of embossing an outer face of a plywood panel which comprises determining the location and size of voids in plies of the panel other than the ply providing said outer face, placing in registry with voids so located and offset from the centers of the respective voids toward a predetermined edge of said panel pads of resilient material substantially smaller than the respectively associated voids, and then passing said panel and pads between an embossing roller and a backing roller with said predetermined edge of sad panel leading.

3. The method of embossing an outer face of a plywood panel which comprises projecting light through said panel to reveal voids in an intermediate ply thereof, placing a pad of resilient material in registry with each of said voids, and then subjecting said panel and pads to pressure of an embossing roller.

4. The method of embossing an outer face of a plywood panel which comprises projecting light upwardly through said panel to locate voids in an intermediate ply thereof, placing in registry with said voids pads substantially smaller than the respectively associated voids, and subjecting said panel and pads to upward pressure of an embossing die.

5. The method of embossing an outer face of a plywood panel which comprises projecting light through said panel to locate voids in an intermediate ply thereof, placing in registry with said voids pads substantially smaller than the respectively associated voids and disposing said pads in position offset from the centers of their respectively associated voids toward a predetermined edge of said panel, and then passing said panel and pads between embossing rollers.

6. The method of embossing an outer face of a plywood panel which comprises placing said panel with said face thereof to be embossed down, projecting light upwardly through said panel to reveal voids in the uppermost ply and voids in an intermediate ply thereof, placing in registry with said voids pads substantially smaller than the respectively associated voids and disposing said pads in position offset from the centers of their respectively associated voids toward a predetermined edge of said panel and then passing said panel and pads between embossing rollers.

7. Apparatus for embossing plywood, comprising a revolubly mounted embossing roller, a pressure roller revolubly mounted thereabove, means for rotating at least one of said rollers, an inspection table adjacent said rollers at the intake side thereof, said table comprising an open-topped box, means for guiding panels to be inspected across the top of said box, and illuminating means within said box directing light upwardly to pass through panels passing over said box, whereby voids within interior plies of said panels are revealed by relatively more brightly illuminated spots on the upper surface of said panels as they pass over said box, means for compensating for said voids as said panels pass between said rollers, said compensating means being adapted to be placed upon said more brightly illuminated spots while over said inspection table, and means for guiding said panels and compensating means to and between said rollers.

8. Apparatus for embossing plywood, comprising a revolubly mounted embossing roller, a pressure roller revolubly mounted thereabove, means for rotating at least one of said rollers, an inspection table adjacent said rollers at the intake side thereof, said table comprising an open-topped box, means for guiding panels to be inspected across the top of said box, and illuminating means within said box directing light upwardly to pass through panels passing over said box, whereby voids within interior plies of said panels are revealed by relatively more brightly illuminated spots on the upper surface of said panel as they pass over said box, pads of resilient sheet material adapted to be placed upon said more brightly illuminated spots and thereby located in registry with said voids while over said inspection table, and means for guiding said panels and pads to and between said rollers.

References Cited in the file of this patent

UNITED STATES PATENTS

| 666,468 | Clear | Jan. 22, 1901 |
| 1,902,032 | Horine | Mar. 21, 1933 |
| 2,455,033 | Wright | Nov. 30, 1948 |
| 2,565,868 | Mann | Aug. 28, 1951 |